Figure 1:
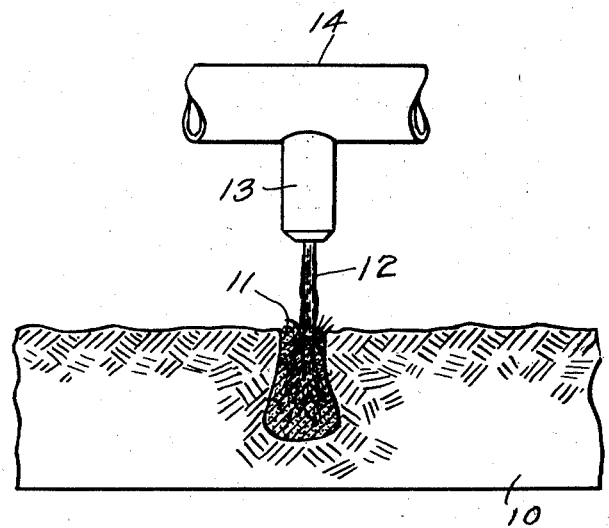

Patented June 12, 1951

2,556,162

UNITED STATES PATENT OFFICE 2,556,162

METHOD OF SOIL EROSION CONTROL

Jewell R. Benson, Denver, Colo., assignor to the United States of America as represented by the Secretary of the Interior Application October 17, 1947, Serial No. 780,563

4 Claims. (Cl. 61—36)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

My invention comprises a method of soil erosion control by means of a plurality of spaced wind and water resisting dikes transverse to the direction of eroding fluid currents, whether wind or water, and particularly to dikes which are relatively permanent and may be produced on a large scale at a comparatively low cost per unit of area. In the drawing:

Figure 1 is a diagrammatic elevation, partly in section, illustrating my method of forming erosion resisting dikes of initially fluid asphalt.

Figure 2:
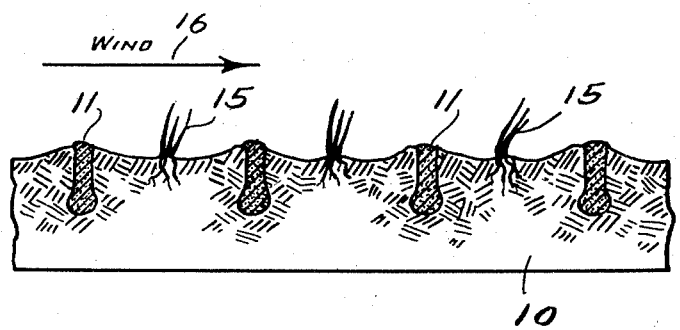

Figure 2 is a diagrammatic section illustrating the action of my dikes in controlling erosion and protecting plant growth. In this drawing, loose soil subject to fluid erosion is indicated by 10 having a dike 11 formed of liquid asphalt mixed with soil. These dikes may be formed by forcing, under pressure, a jet 12 of liquid asphalt from a nozzle 13 fed by a spray bar 14.

In Fig. 2 a section of a plurality of spaced dikes 11 is shown with loose soil 10 supporting plants 15 intermediate adjacent dikes while an assumed direction of the wind is indicated by an arrow 16.

I prefer to form my dikes from an initially plastic or cementitious material under high pressure through a suitable jet for forming in the uppermost strata of soil, a plurality of spaced relatively permanent dikes of surface soil combined with hardened plastic material.

My dikes are relatively impermeable to water and therefore check the lateral flow of water in the surface soil.

My novel method utilizes standardized equipment in common use for spraying bituminous materials but substitutes a jet nozzle for the fan spray nozzles commonly used. My method is not confined to the use of bituminous materials but may utilize other initially fluid materials which harden upon cooling or exposure to the air.

The sizes of my dikes and the directions followed will vary greatly with local conditions, for example, on rolling land the dikes may follow contours of equal elevation and the spacing may vary inversely with the steepness of the slope of the soil.

While I have shown and described a preferred embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim is:

1. A method of soil erosion control which comprises forming in loose soil a plurality of spaced wind and water resisting dikes by injecting an initially fluid plastic material into said soil along lines transverse to the direction of eroding fluid currents.

2. A method of controlling erosion of loose soil which comprises applying an initially fluid plastic material by a high pressure jet along lines transverse to the prevailing direction of eroding fluid currents, whereby erosion resisting dikes are formed by the combination of soil with said plastic materials.

3. A method of soil erosion control which comprises jetting a fluid cementation substance into said soil along lines transverse to the direction of eroding fluid currents whereby permanent protective dikes are formed.

4. The hereindescribed method of checking soil erosion which comprises subjecting loose soil to the action of a jet of initially fluid plastic material along a plurality of spaced lines transverse to the direction of eroding fluid currents to form with soil disturbed by said jet a plurality of erosion resisting dikes.

JEWELL R. BENSON.

REFERENCES CITED

The following references are of record in the file of this patent:

UNITED STATES PATENTS

| Number | Name | Date |
| --- | --- | --- |
| 1,507,868 | Stubbs | Sept. 9, 1924 |
| 1,905,176 | Kieckhefer | Apr. 25, 1933 |
| 1,938,023 | Ingalls | Dec. 5, 1933 |

OTHER REFERENCES

Engineering News-Record, page 50 of Aug. 17, 1939. Issue 61-37.